US011496686B2

(12) United States Patent
Ikeda

(10) Patent No.: US 11,496,686 B2
(45) Date of Patent: Nov. 8, 2022

(54) DISPLAY CONTROL APPARATUS, DISPLAY CONTROL METHOD, AND STORAGE MEDIUM STORING PROGRAM OF THE SAME

(71) Applicant: CANON KABUSHIKI KAISHA, Tokyo (JP)

(72) Inventor: Kaori Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 17/027,973

(22) Filed: Sep. 22, 2020

(65) Prior Publication Data

US 2021/0099648 A1 Apr. 1, 2021

(30) Foreign Application Priority Data

Sep. 30, 2019 (JP) .............................. JP2019-179834

(51) Int. Cl.
*H04N 5/232* (2006.01)
*G09G 3/20* (2006.01)

(52) U.S. Cl.
CPC .......... *H04N 5/23293* (2013.01); *G09G 3/20* (2013.01); *H04N 5/23229* (2013.01); *G09G 2340/0464* (2013.01)

(58) Field of Classification Search
CPC .......... H04N 5/23293; H04N 5/23229; H04N 5/23222; H04N 5/23241; H04N 5/232939; G09G 3/20; G09G 2340/0464; G09G 2320/06; G09G 2320/0606; G06F 3/0481; G06F 3/14
See application file for complete search history.

(56) References Cited

U.S. PATENT DOCUMENTS

| 10,678,882 B2* | 6/2020 | Knox | G06F 40/143 |
| 2017/0132752 A1* | 5/2017 | Aoyagi | G06T 19/006 |
| 2020/0065546 A1* | 2/2020 | Hara | G06V 10/40 |
| 2020/0129850 A1* | 4/2020 | Ohashi | G09G 5/36 |
| 2021/0043158 A1* | 2/2021 | Ko | G09G 3/20 |
| 2021/0113196 A1* | 4/2021 | Imai | G06F 3/041 |

FOREIGN PATENT DOCUMENTS

JP 2011-155595 A 8/2011

* cited by examiner

*Primary Examiner* — Hung H Lam

(74) *Attorney, Agent, or Firm* — Canon U.S.A., Inc. IP Division

(57) ABSTRACT

A display control apparatus is provided that performs control to display an image on a display unit, and that displays a plurality of lines in such a manner that the plurality of lines are superimposed on the image displayed on the display unit, displays, when an arrangement change operation is being performed on any line of the plurality of displayed lines, arrangement information regarding arrangement of each of the lines, the arrangement information displayed in a superimposed manner, and then, executes at least processing for displaying an operation target line to be distinguishable from an operation non-target line, or processing for displaying arrangement information of the operation target line to be distinguishable from arrangement information of the operation non-target line.

15 Claims, 9 Drawing Sheets

FIG.9A

|  | REFERENCE COORDINATES (x, y) | ROTATIONAL ANGLE | COLOR | WHETHER TO DISPLAY AT FRONT |
|---|---|---|---|---|
| GUDE LINE 408a | (280, 70) | 27.26 | BLUE | NO |
| GUDE LINE 408b | (208, 176) | 26.98 | BLUE | NO |
| GUDE LINE 408c | (206, 165) | -70.72 | BLUE | NO → YES |
| GUDE LINE 408d | (209, 206) | -25.91 | BLUE | NO |

FIG.9B

|  | REFERENCE COORDINATES (x, y) | NUMERICAL VALUE | DISPLAY SIZE | FONT SIZE | COLOR | WHETHER TO DISPLAY AT FRONT |
|---|---|---|---|---|---|---|
| NUMERICAL LABEL 409a | (280, 70) | 27.26 | 50 × 20 | 14 | BLACK (TRANSPARENCY 20%) | NO |
| NUMERICAL LABEL 409b | (278, 176) | 26.98 | 50 × 20 | 14 | BLACK (TRANSPARENCY 20%) | NO |
| NUMERICAL LABEL 409c | (206, 165) | -70.72 | 50 × 20 → 60 × 25 | 14 → 16 | BLACK (TRANSPARENCY 20%) | NO → YES |
| NUMERICAL LABEL 409d | (209, 206) | -25.91 | 50 × 20 | 14 | BLACK (TRANSPARENCY 20%) | NO |

FIG.9C

|  | REFERENCE COORDINATES (x, y) | NUMERICAL VALUE | DISPLAY SIZE | FONT SIZE | COLOR | WHETHER TO DISPLAY AT FRONT |
|---|---|---|---|---|---|---|
| NUMERICAL LABEL 409a | (280, 70) | 27.26 | 50 × 20 | 14 | BLACK (TRANSPARENCY 20%) | NO |
| NUMERICAL LABEL 409b | (278, 176) → (141, 140) | 26.98 | 50 × 20 | 14 | BLACK (TRANSPARENCY 20%) | NO |
| NUMERICAL LABEL 409c | (206, 165) | -70.72 | 50 × 20 | 14 | BLACK (TRANSPARENCY 20%) | NO |
| NUMERICAL LABEL 409d | (209, 206) | -25.91 | 50 × 20 | 14 | BLACK (TRANSPARENCY 20%) | NO |

DISPLAY CONTROL APPARATUS, DISPLAY CONTROL METHOD, AND STORAGE MEDIUM STORING PROGRAM OF THE SAME

BACKGROUND

Field

The present disclosure relates to a display control apparatus, a method, and a storage medium.

Description of the Related Art

In displaying a remote image capturing application or an image browsing application that operates in a personal computer, or in displaying a display screen included in an imaging apparatus main body, some devices have a function for displaying a line (referred to as a guide line) to aid in composition confirmation, the guide line being superimposed on an image, for example. For example, Japanese Patent Application Laid-Open No. 2011-155595 discusses a configuration for displaying a grid line and a vertical line corresponding to an aspect ratio, with such grid line and vertical line being superimposed on a live view image.

In addition, in the case of displaying a guide line which is superimposed on an image, some configurations make the position and the angle of the guide line changeable without fixing the guide line. The configurations allows the user to arrange a guide line in accordance with a composition desired by the user, and to use the guide line as an aid for image capturing and image editing.

In addition, in the functions for displaying a guide line which is superimposed on an image, some functions display a plurality of guide lines which are superimposed on an image. In addition, by displaying arrangement information regarding the arrangement of each guide line, the arrangement information being superimposed on the image in accordance with a corresponding guide line, the user can adjust the arrangement of each guide line while minutely checking the arrangement relationship between guide lines.

Nevertheless, when the user is performing an operation for changing the position and the angle of a guide line, it sometimes becomes difficult to recognize an operation target guide line and arrangement information thereof. For example, it becomes difficult to recognize an operation target guide line and arrangement information thereof when the position and the angle of the operation target guide line get close to the position and the angle of another guide line, or when arrangement information of the operation target guide line overlaps with arrangement information of another guide line.

SUMMARY

According to various embodiments of the present disclosure, a display control apparatus is provided that performs control to display an image on a display unit, and that displays a plurality of lines in such a manner that the plurality of lines are superimposed on the image displayed on the display unit, displays, when an arrangement change operation is being performed on any line of the plurality of displayed lines, arrangement information regarding arrangement of each of the lines, the arrangement information displayed in a superimposed manner, and then, executes at least processing for displaying an operation target line to be distinguishable from an operation non-target line, or processing for displaying arrangement information of the operation target line to be distinguishable from arrangement information of the operation non-target line.

Further features will become apparent from the following description of exemplary embodiments with reference to the attached drawings.

BRIEF DESCRIPTION OF THE DRAWINGS

FIGS. 9A, 9B, and 9C are diagrams illustrating an example of display parameters according to one embodiment.

DESCRIPTION OF THE EMBODIMENTS

Hereinafter, exemplary embodiments of the present disclosure will be described with reference to the attached drawings.

<System Configuration>

Figure 1:
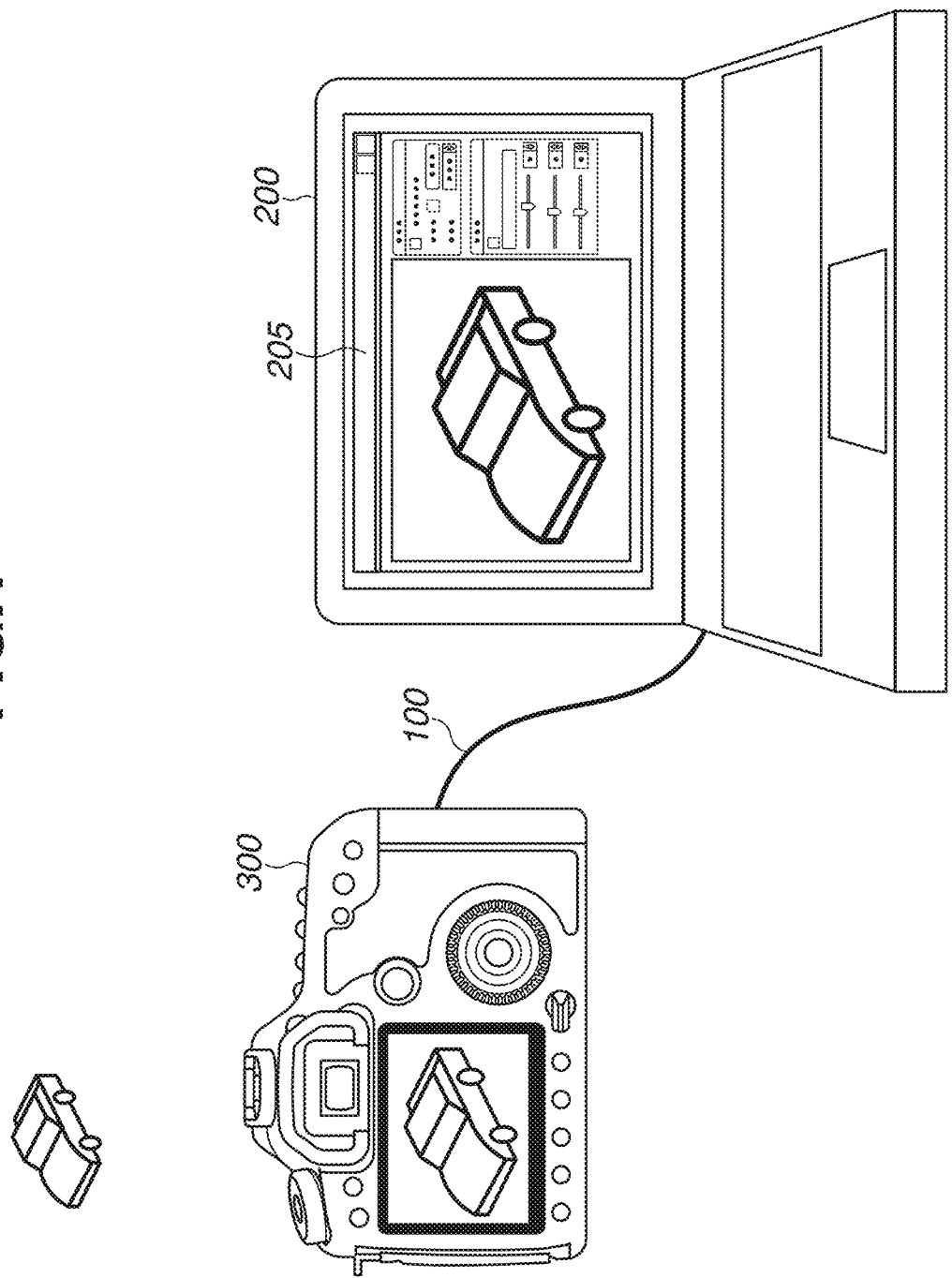
FIG. 1 is a diagram illustrating a configuration example of a display system according to one embodiment.

FIG. 1 is a diagram illustrating a configuration example of a display system according to a first exemplary embodiment.

The display system includes a personal computer (hereinafter, will be referred to as a "PC") 200 serving as a display control apparatus, and a digital camera 300 serving as an imaging apparatus. The PC 200 and the digital camera 300 are connected via a cable 100, and transmit and receive various types of data. When the digital camera 300 transmits a live view image to the PC 200, the live view image is displayed on a display unit 205 of the PC 200. In addition, the digital camera 300 receives various instructions for controlling image capturing, from the PC 200, and executes an image capturing operation in accordance with the received instructions.

In the example illustrated in FIG. 1, the PC 200 and the digital camera 300 are connected via the cable 100, but the PC 200 and the digital camera 300 may be connected by wireless communication. In addition, FIG. 1 illustrates the PC 200 as a display control apparatus connected with the digital camera 300, but the display control apparatus is not limited to this. Any external device that can implement the following functions, such as a tablet terminal, may be used as a display control apparatus.

<Configuration of PC 200>

Figure 2:
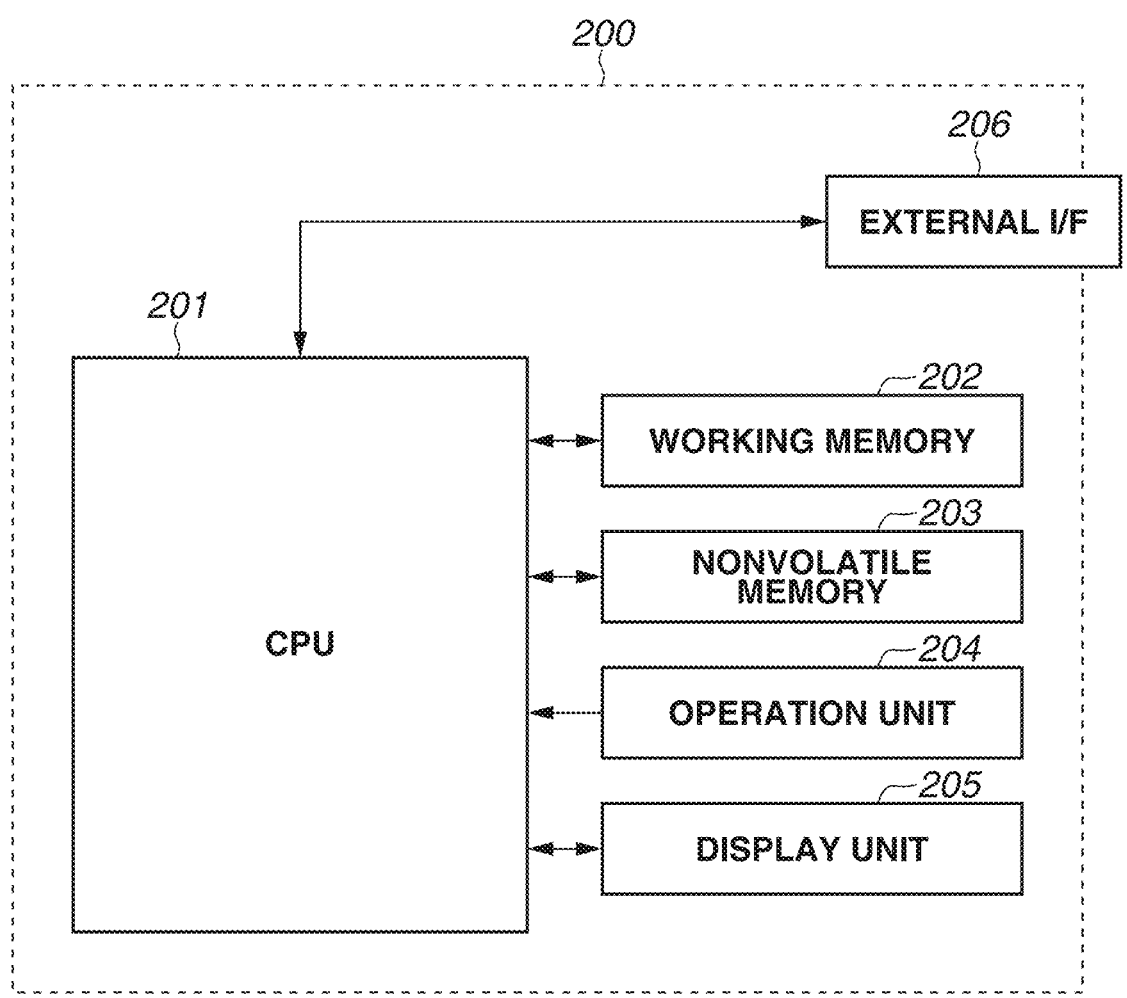
FIG. 2 is a block diagram illustrating a configuration example of a personal computer according to one embodiment.

FIG. 2 illustrates a configuration example of the PC 200.

The PC 200 includes a central processing unit (CPU) 201, a working memory 202, a nonvolatile memory 203, an operation unit 204, the display unit 205, and an external interface (I/F) 206.

The CPU 201 controls each component of the PC 200 using the working memory 202 as a working memory, in accordance with a program stored in the nonvolatile memory 203, for example. The working memory 202 includes a random access memory (RAM) (volatile memory that uses a semiconductor device, etc.), for example. The nonvolatile memory 203 includes a hard disc (HD) or a read-only memory (ROM), for example. The nonvolatile memory 203 stores image data, audio data, other types of data, and various programs for operating the CPU 201. The programs include programs for executing various flowcharts to be described below in the present exemplary embodiment.

The operation unit 204 is an input device for receiving a user operation, including a character information input device such as a keyboard, a pointing device such as a mouse or a touch panel, a button, a dial, a joystick, a touch sensor, or a touch pad.

Based on the control of the CPU 201, the display unit 205 displays an image formed from video data or image data, and a graphical user interface (GUI) screen forming a GUI. The CPU 201 performs control to generate a display control signal in accordance with a program, generate a video signal for performing display on the display unit 205, and output the video signal. In addition, the display unit 205 may include an external monitor (television, or the like).

The external I/F 206 is an interface for connecting with an external device by a wired cable or wireless communication, and for performing input-output of a video signal and a voice signal. The PC 200 connects with the digital camera 300 via the external I/F 206 and the cable 100.

<Configuration of Digital Camera 300>

Figure 3:
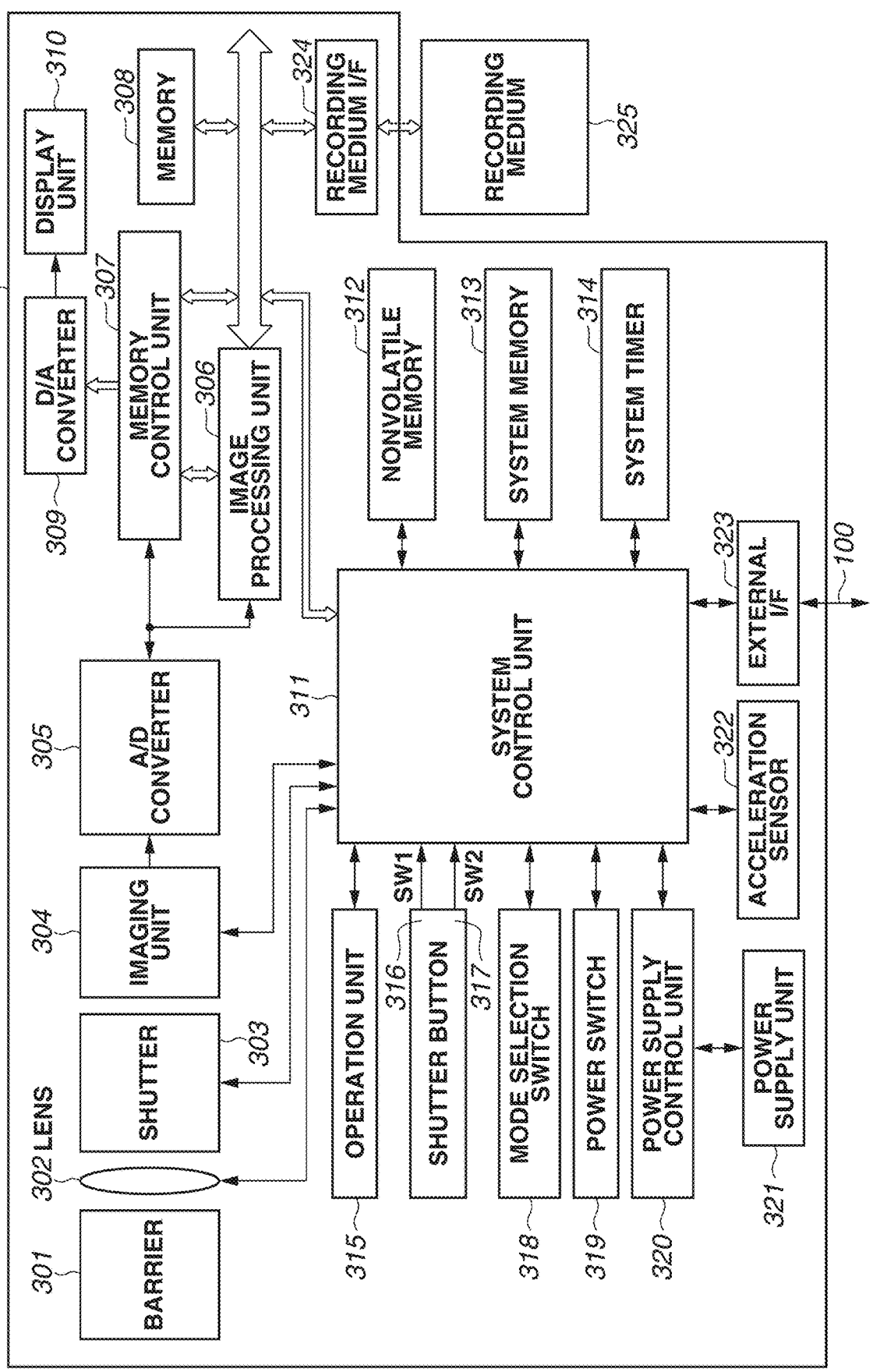
FIG. 3 is a block diagram illustrating a configuration example of a digital camera according to one embodiment.

FIG. 3 illustrates a configuration example of the digital camera 300.

A lens 302 is a lens unit including a zoom lens and a focus lens. A shutter 303 is a shutter having an aperture function. The imaging unit 304 is an image sensor including a charge-coupled device (CCD) sensor or a complementary metal-oxide semiconductor (CMOS) sensor that converts an optical image into an electrical signal. By covering an imaging system including the lens 302, the shutter 303, and the imaging unit 304 with a barrier 301, the barrier 301 protects the imaging system from dirt or damage. An analog-to-digital (A/D) converter 305 converts an analog signal output from the imaging unit 304, into a digital signal.

An image processing unit 306 performs resize processes such as predetermined pixel interpolation and reduction, and color conversion processing on data from the A/D converter 305 or data from a memory control unit 307. The image processing unit 306 also performs predetermined calculation processing using data of a captured image, and a system control unit 311 performs exposure control and ranging control based on the obtained calculation result. Through-the-lens (TTL) system autofocus (AF) processing, autoexposure (AE) processing, and electronic flash pre-emission (EF) processing are thereby performed. The image processing unit 306 further performs predetermined calculation processing using data of a captured image, and also performs TTL system automatic white balance (AWB) processing based on the obtained calculation result.

Output data from the A/D converter 305 is written into a memory 308 via the image processing unit 306 and the memory control unit 307, or via the memory control unit 307. The memory 308 stores image data obtained by the imaging unit 304 and converted by the A/D converter 305 into digital data, and image data to be displayed on a display unit 310. The memory 308 has a storage capacity sufficient for storing a predetermined number of still images, and a predetermined time length of a moving image and voice. In addition, the memory 308 also serves as a memory for image display (video memory). A digital-to-analog (D/A) converter 309 converts data for image display that is stored in the memory 308, into an analog signal, and supplies the analog signal to the display unit 310. The image data for display that has been written into the memory 308 in this manner is displayed by the display unit 310 via the D/A converter 309. The display unit 310 performs display in accordance with an analog signal from the D/A converter 309, on a display device such as a liquid crystal display (LCD). In addition, the display unit 310 functions as an electronic viewfinder by live image display (live view display). In this case, digital signals once A/D-converted by the A/D converter 305 and accumulated in the memory 308 are converted by the D/A converter 309 into analog signals, and the analog signals are sequentially transferred to the display unit 310 and displayed thereon.

The system control unit 311 controls the entire digital camera 300. By executing a program stored in a nonvolatile memory 312, the system control unit 311 implements each piece of processing according to the present exemplary embodiment, which will be described below. In addition, the system control unit 311 also performs display control by controlling the memory 308, the D/A converter 309, and the display unit 310.

The nonvolatile memory 312 is an electrically-erasable/recordable memory, and for example, an electrically erasable programmable read-only memory (EEPROM) is used. Constants for operating the system control unit 311 and programs are stored in the nonvolatile memory 312. Generally, a RAM is used as a system memory 313. The system memory 313 holds constants for operating the system control unit 311, and variables, and programs read out from the nonvolatile memory 312 are loaded onto the system memory 313.

A system timer 314 is a time measuring unit for measuring a time used for various types of control or a time of a built-in clock.

An operation unit 315, a shutter button (first shutter switch 316 and second shutter switch 317), and a mode selection switch 318 are operation units for inputting various operation instructions to the system control unit 311.

By selecting and operating various functional icons displayed on the display unit 310, functions are appropriately allocated for each scene to the respective operation members of the operation unit 315, and the operation members function as various functional buttons. Examples of the functional buttons include an end button, a return button, an image feed button, a jump button, a narrowing-down button, and an attribute change button. For example, when a menu button is pressed, a menu screen for enabling various settings to be performed is displayed on the display unit 310. The user can intuitively perform various settings using the menu screen displayed on the display unit 310, four-direction (up, down, left, and right) buttons, and a SET button.

The first shutter switch 316 is turned ON in the middle of the operation of the shutter button provided on the digital camera 300. That is to say, the first shutter switch 316 is turned ON by so-called half press (image capturing preparation instruction), and generates a first shutter switch signal SW1. In accordance with the first shutter switch signal SW1, the operation of AF processing, AE processing, AWB processing, or EF processing is started. The second shutter switch 317 is turned ON upon the completion of the press operation of the shutter button. That is to say, the second shutter switch 317 is turned ON by so-called full press (image capturing instruction), and generates a second shutter switch signal SW2. In accordance with the second shutter switch signal SW2, the system control unit 311 starts operations of a series of image capturing processes starting from the readout of a signal from the imaging unit 304 up to writing of image data onto a recording medium 325.

The mode selection switch 318 switches an operation mode of the system control unit 311 to any of a still image recording mode, a moving image recording mode, and a reproduction mode. The still image recording mode includes modes such as an automatic image capturing mode, an automatic scene determination mode, a manual mode, various scene modes having different image capturing settings for respective image capturing scenes, a program AE mode, and a custom mode. The mode selection switch 318 can directly switch the operation mode to any of these modes included in the still image recording mode. Alternatively, an operation mode may be switched in the following manner. The mode selection switch 318 once switches the operation mode to the still image recording mode, and then, switches the still image recording mode to any of these modes included in the still image recording mode using another operation member. In a similar manner, the moving image recording mode may also include a plurality of modes.

A power supply control unit 320 includes a battery detecting circuit, a direct current (DC)-DC converter, and a switch circuit for switching a block to be supplied with power. The power supply control unit 320 detects whether a battery is attached, the type of the battery, and remaining battery capacity. In addition, the power supply control unit 320 controls the DC-DC converter based on the detection result and an instruction from the system control unit 311, and supplies necessary voltage to components including the recording medium 325 for a necessary time period. When a power switch 319 is turned on, the system control unit 311 instructs the power supply control unit 320 to supply power to each component. A power supply unit 321 includes a primary battery such as an alkaline battery or a lithium battery, a secondary battery such as a nickel-cadmium (NiCd) battery, a nickel-metal hydride (NiMH) battery, or a lithium-ion battery, or an alternating current (AC) adapter.

An acceleration sensor 322 is a sensor that detects acceleration added to the digital camera 300. The acceleration sensor 322 can detect acceleration in three axes including an X-axis, a Y-axis, and a Z-axis, and can thereby detect yaw, roll, and pitch in the gravitational force direction of the digital camera 300. The system control unit 311 detects gravitational acceleration (gravitational force direction) using the acceleration sensor 322, and performs processing of detecting the orientation of the digital camera 300. The system control unit 311 sets a rotational state in accordance with which of the reference orientations including a normal position, a right vertical position, a left vertical position, and a reverse position the detected orientation is close to.

An external I/F 323 is an interface for connecting with an external device. The external I/F 323 can connect with an external device by wired communication or wireless communication, and can exchange information (including video information and information from the acceleration sensor 322) with the external device. Examples of the wired communication include communication performed via a universal serial bus (USB) cable, a local area network (LAN) cable, or a high-definition multimedia interface (HDMI) (registered trademark) cable. Examples of the wireless communication include communication performed using a wireless LAN or Bluetooth (registered trademark). In addition, the external I/F 323 may be a video output terminal, and can output a live view image being captured by the imaging unit 304, a video obtained by reproducing images recorded on the recording medium 325, and a GUI video such as various icons and information display, and cause an external monitor to display these images and videos. The external I/F 323 can output a video similar to a video displayed on the display unit 310, and can also output a video generated to be suitable for the external monitor. The digital camera 300 connects with the PC 200 via the external I/F 323 and the cable 100.

A recording medium I/F 324 is an interface with the recording medium 325 such as a memory card or a hard disc. The recording medium 325 is a recording medium such as a memory card for recording a captured image, and includes a semiconductor memory or a magnetic disc.

<Display Example in PC 200>

Display examples in the PC 200 will be described with reference to FIGS. 4A, 4B, 5A, and 5B.

Figure 4A:
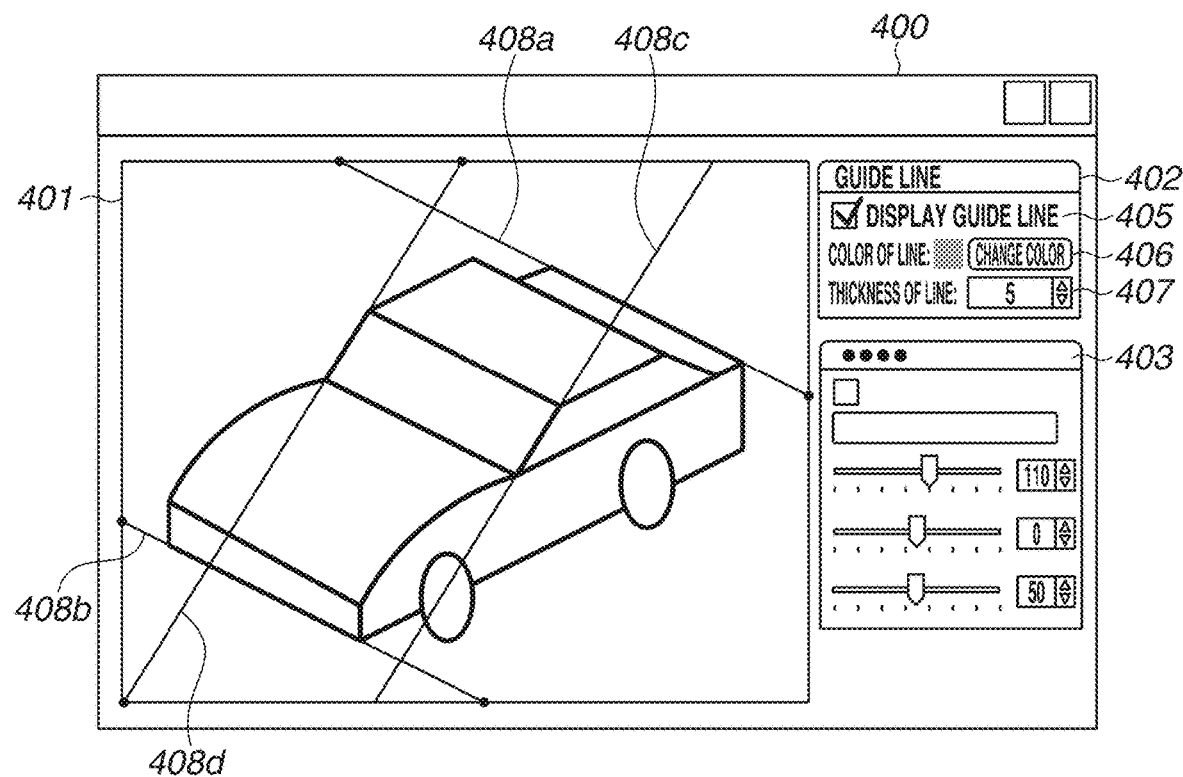
FIGS. 4A and 4B are diagrams each illustrating a display example in the personal computer according to one embodiment.

FIG. 4A illustrates a display example of a remote live view screen 400 displayed on the display unit 205 by the PC 200 in a state in which the PC 200 and the digital camera 300 are connected.

The remote live view screen 400 includes alive view display region 401, a guide line operation portion 402, and a functional operation portion 403.

The CPU 201 displays a live view image received from the digital camera 300, in the live view display region 401.

In the guide line operation portion 402, various operation portions 405 to 407 for performing settings related to guide lines are set. The display switching operation portion 405 is an operation portion for the user setting whether to display a guide line. When the user operates the display switching operation portion 405 and makes a setting to display a guide line, the CPU 201 displays four guide lines 408a to 408d in the present exemplary embodiment with being superimposed on a live view image displayed in the live view display region 401. In addition, the color change operation portion 406 is an operation portion for changing the setting of the color of the guide lines 408a to 408d. When the user operates the color change operation portion 406, the CPU 201 changes the setting of the color of the guide lines 408a to 408d and displays the guide lines 408a to 408d in accordance with the operation. In addition, the thickness change operation portion 407 is an operation portion for changing the setting of the thickness of the guide lines 408a to 408d. When the user operates the thickness change operation portion 407, the CPU 201 changes the setting of the thickness of the guide lines 408a to 408d and displays the guide lines 408a to 408d in accordance with the operation. In the present exemplary embodiment, the color and the thickness of the guide lines are set in common among all the guide lines, but the color and the thickness of each guide line may be individually set.

In the functional operation portion 403, various operation portions for operating functions other than the guide lines are set. For example, the functional operation portion 403 may include an overlay setting operation portion for combining a designated image and displaying the combined image in the live view display region 401. In addition, the functional operation portion 403 may include an imaging operation portion for issuing an image capturing request to the digital camera 300. In addition, the functional operation portion 403 may include a focus operation portion for issuing an autofocusing request to the digital camera 300.

The arrangement (positions and rotational angles) of the guidelines 408a to 408d can be changed on the live view display region 401 by a user operation. For example, by selecting end points of the guide lines 408a to 408d via the operation unit 204, and designating a direction by a drag operation, the user can change rotational angles of the guide lines 408a to 408d. In addition, by selecting points on the guide lines 408a to 408d that are other than the end points via the operation unit 204, and designating a direction by a drag operation, the user can move the positions of the guide lines 408a to 408d. The change operation method of the positions and the rotational angles of guide lines is not limited to this. For example, an operation member for setting the position or the rotational angle may be arranged in the guide line operation unit 402, and the CPU 201 may change the positions or the rotational angles of the guide lines 408a to 408d in accordance with a user setting made via the operation member.

As described below, while any of the guide lines 408a to 408d is being operated by the user, the CPU 201 displays numerical labels 409a to 409d displaying rotational angles, near the respective guide lines 408a to 408d, as arrangement information regarding the arrangement of the respective guide lines 408a to 408d.

Figure 4B:
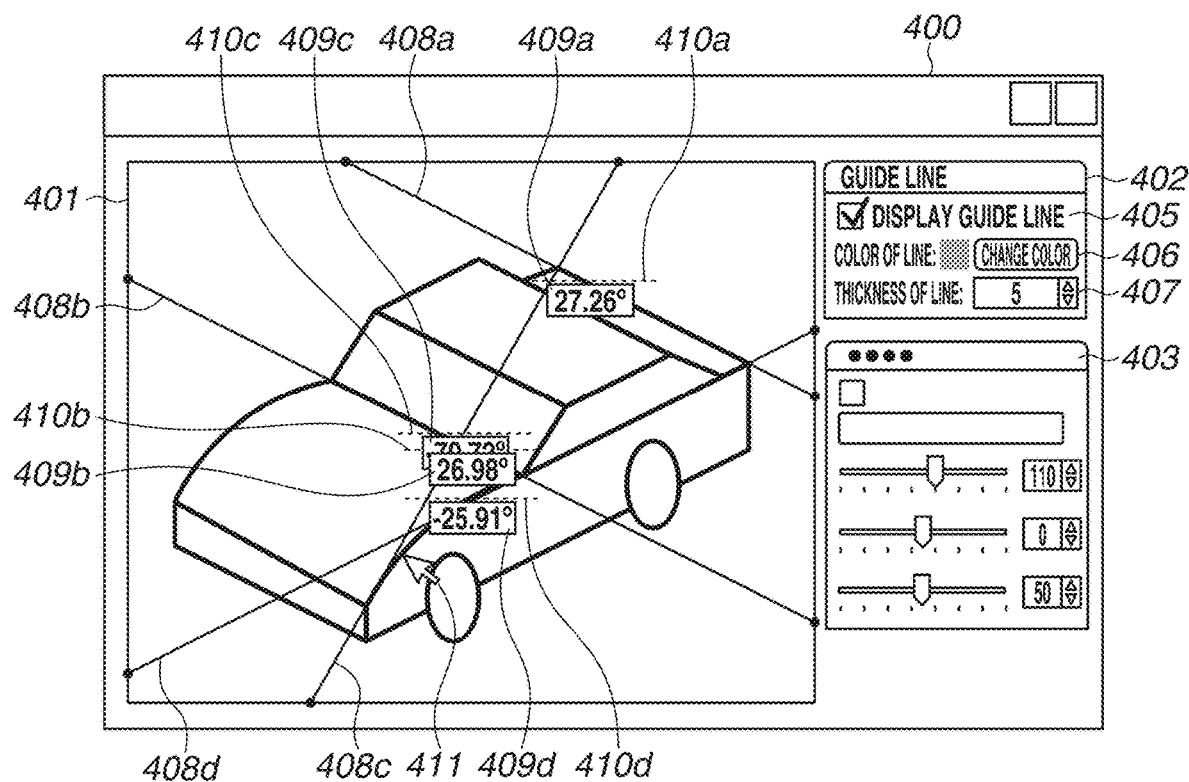

A comparative example will now be described with reference to FIG. 4B. FIG. 4B illustrates a display example that is a comparative example of when any of the guide lines 408a to 408d is being operated by the user on the remote live view screen 400 displayed on the display unit 205 by the PC 200.

While any of the guide lines 408a to 408d is being operated by the user, the CPU 201 displays the numerical labels 409a to 409d respectively corresponding to the guide lines 408a to 408d, near the central parts of the guide lines 408a to 408d. Then, the CPU 201 displays the rotational angles of the corresponding guide lines 408a to 408d in the numerical labels 409a to 409d. For example, because the guide line 408a is rotated clockwise by 27.26 degrees with reference to a horizontal line, "27.26°" is displayed in the corresponding numerical label 409a. In a similar manner, because the guide line 408d is rotated clockwise by −25.91 degrees with reference to the horizontal line, "−25.91°" is displayed in the corresponding numerical label 409d.

In addition, the CPU 201 displays lines (reference lines) 410a to 410d that are benchmarks of the respective rotational angles, above the numerical labels 409a to 409d. As described above, the horizontal line is used as a benchmark of a rotational angle, and the CPU 201 displays broken horizontal line as the reference lines 410a to 410d. By displaying the reference lines 410a to 410d, it becomes easier to visually recognize the benchmarks based on which the rotational angles are.

The reference lines are displayed as broken lines, but the reference lines are not limited to broken lines.

In addition, the horizontal line is used as a benchmark of a rotational angle, and the horizontal line is displayed as a reference line, but a benchmark needs not be set to the horizontal line. For example, a vertical line (line vertical to the horizontal direction) may be employed as a benchmark of a rotational angle. At this time, a rotational angle is digitized as a rotational angle with respect to the vertical line, and is displayed in each numerical label. In addition, the vertical line is displayed near a numerical label as a reference line. In addition, for example, a specific angle (45-degree direction, or the like) may be employed as a benchmark of a rotational angle.

In addition, the rotational angles of the guide lines 408a to 408d are displayed in the numerical labels 409a to 409d, but numerical values displayed in the numerical labels 409a to 409d are not limited to rotational angles. For example, a coordinate value regarding the position of a corresponding guide line may be displayed in a numerical label. Alternatively, a distance between a corresponding guide line and another guide line may be displayed in a numerical label.

FIG. 4B illustrates, as an example, a state in which the guide line 408c is being operated by the user. The CPU 201 displays a cursor 411 near the guide line (hereinafter, will be referred to as an operation target guide line) 408c being operated by the user. The CPU 201 changes the display position of the guide line 408c, the display position of the numerical label 409c, and a rotational angle to be displayed in the numerical label 409c, in accordance with a user operation. For example, when the user selects a point on the guide line 408c that is other than the end point and performs a drag operation rightward, the CPU 201 translates the guide line 408c and the numerical label 409c rightward in accordance with a user operation amount and displays the translated guide line 408c and numerical label 409c.

In addition, the CPU 201 continues to display the numerical labels 409a, 409b, and 409d of the guide lines (hereinafter, will be referred to as operation non-target guide lines) 408a, 408b, and 408d not being operated by the user.

In this case, depending on the arrangement relationship between the guide lines 408a to 408d, it sometimes becomes difficult to recognize the operation target guide line 408c and the numerical label 409c thereof. In the example illustrated in FIG. 4B, the numerical label 409b of the operation non-target guide line 408b overlaps the numerical label 409c of the operation target guide line 408c, and the rotational angle of the operation target guide line 408c is less-visible. In addition, if the position and the angle of the guide line 408c get close to the position and the angle of the operation non-target guide line 408a, 408b, or 408d, it becomes difficult for the user to recognize a guide line that the user is operating.

Figure 5A:
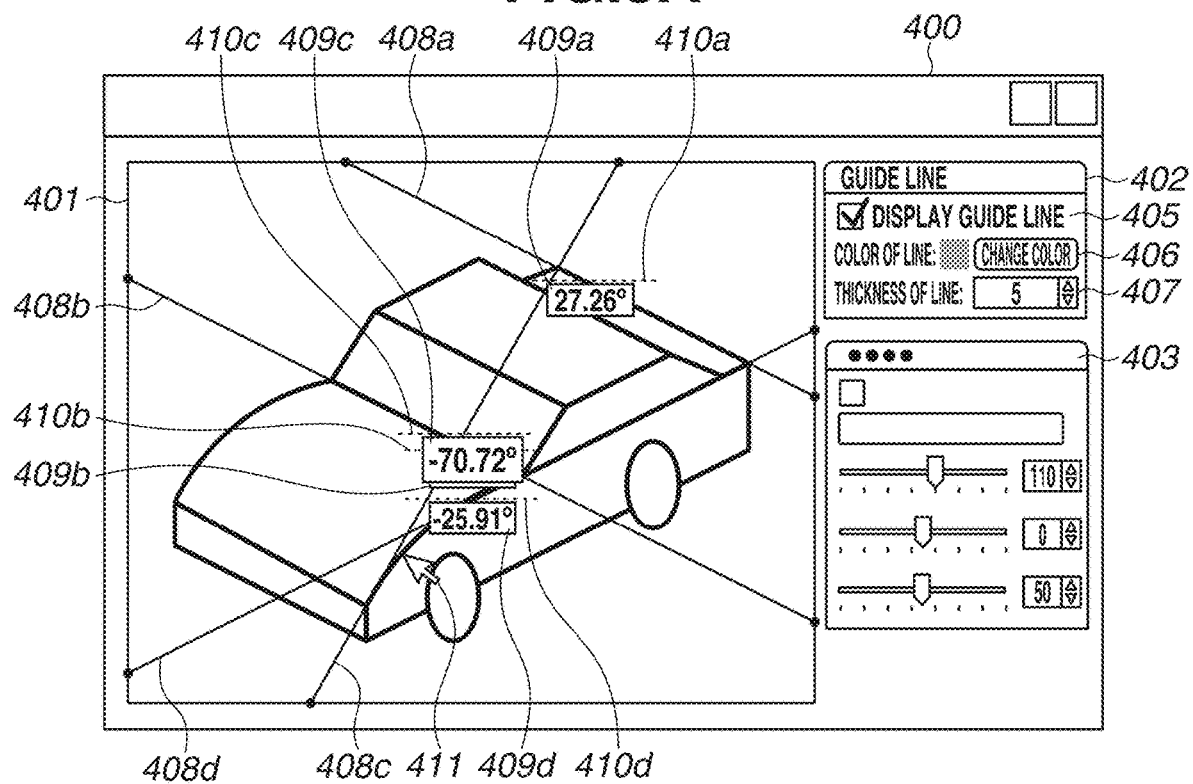
FIGS. 5A and 5B are diagrams each illustrating a display example in the personal computer according to one embodiment.

Next, the present exemplary embodiment will be described with reference to FIG. 5A. FIG. 5A illustrates a display example that is an exemplary embodiment of when any of the guide lines 408a to 408d is being operated by the user in the remote live view screen 400 displayed on the display unit 205 by the PC 200. The description about points common to FIGS. 5A and 4B will be omitted, and different points will be mainly described.

An operation target guide line and a numerical label thereof are considered to be information desired to be more preferentially recognized by the user than an operation non-target guide line and a numerical label thereof. In the present exemplary embodiment, as described below, an operation target guide line and a numerical label thereof are displayed to be distinguishable from an operation non-target guide line and a numerical label thereof.

Similarly to FIG. 4B, FIG. 5A illustrates, as an example, a state in which the guide line 408c is being operated by the user.

In the present exemplary embodiment, the CPU 201 displays the operation target guide line 408c and the numerical label 409c thereof anteriorly to the operation non-target guide lines 408a, 408b, and 408d, and the numerical labels 409a, 409b, and 409d thereof. The numerical label 409c of the operation target guide line 408c can be thereby displayed in a visible manner even when the numerical label 409c of the operation target guide line 408c overlaps a numerical label of an operation non-target guide line (the numerical label 409b in the example illustrated in FIG. 5A).

In addition, in the present exemplary embodiment, the CPU 201 enlarges a display size of the numerical label 409c of the operation target guide line 408c, and enlarges a font size of a character (numerical value) indicating a rotational angle. This can further enhance the visibility of the numerical label 409c of the operation target guide line 408c.

<Processing of PC 200>

Figure 6:
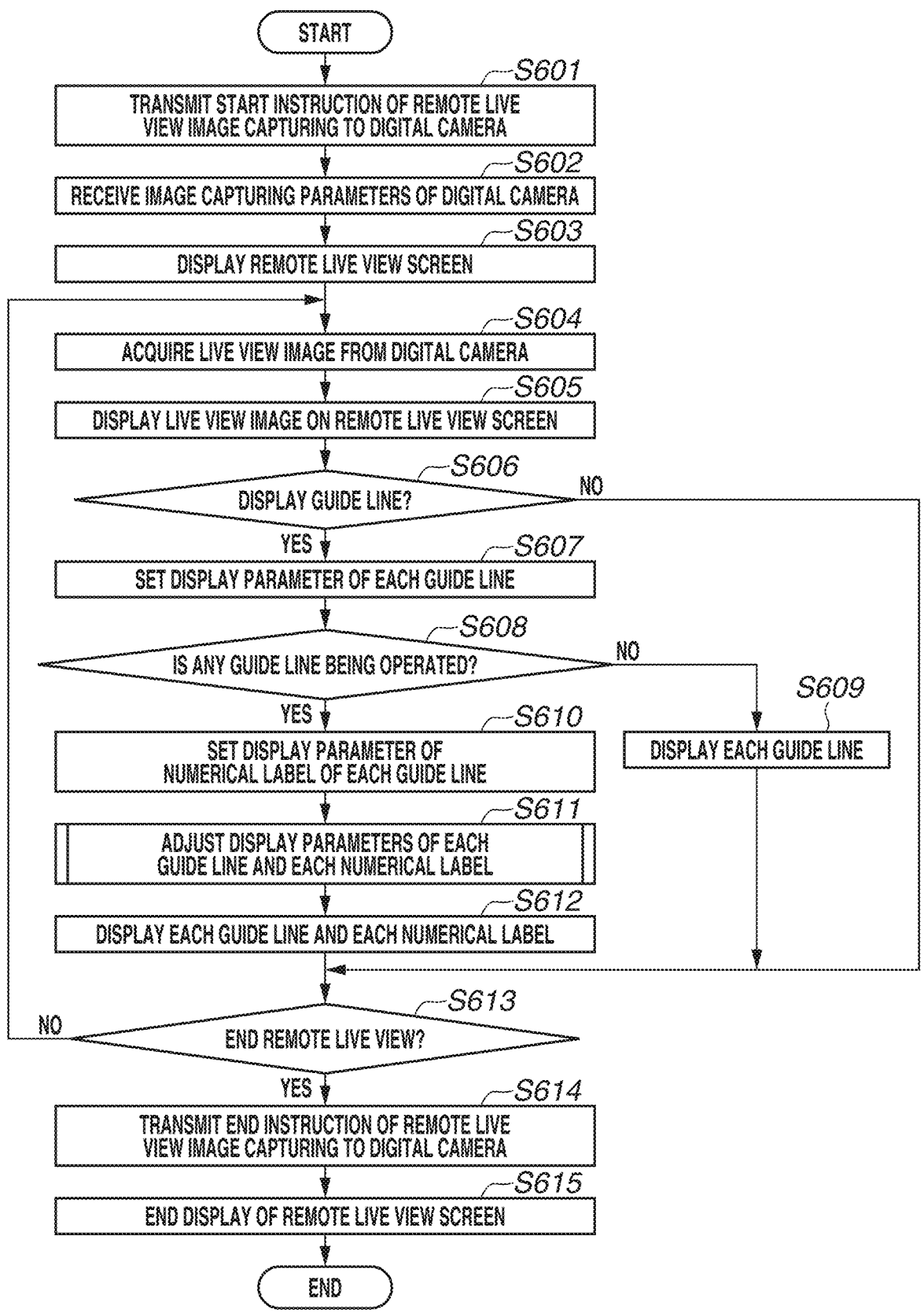
FIG. 6 is a flowchart illustrating a display control procedure performed by the personal computer according to one embodiment.
Figure 7:
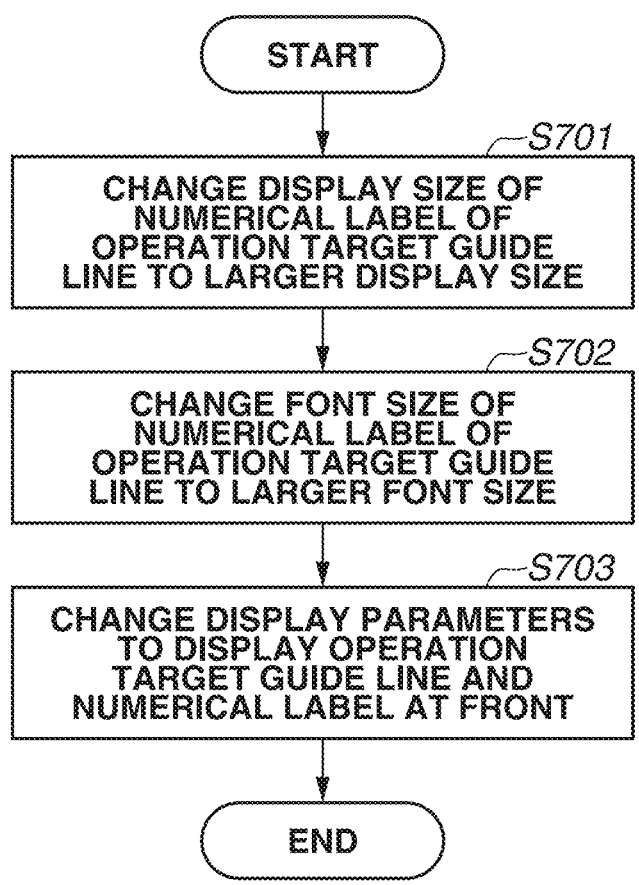
FIG. 7 is a flowchart illustrating an example of adjustment processing of a display parameter according to one embodiment.

Next, processing will be described with reference to FIGS. 6 and 7 in which the PC 200 displays the remote live view screen 400 on the display unit 205 in a state in which the PC 200 and the digital camera 300 are connected. FIG. 6 is a flowchart illustrating a display control procedure performed by the PC 200. The processing illustrated in FIG. 6 is implemented by the CPU 201 executing a program stored in the nonvolatile memory 203, and controlling each component of the apparatus, for example. In addition, processing executed by the digital camera 300 is implemented by the system control unit 311 executing a program stored in the nonvolatile memory 312, and controlling each component of the apparatus, for example.

The following description will be given of an example in which the four guide lines 408a to 408d are displayed and the guide line 408c is regarded as an operation target as illustrated in FIGS. 4A, 4B, 5A, and 5B.

When a startup instruction of a remote image capturing application is issued by a user operation to the PC 200, the CPU 201 starts the processing illustrated in FIG. 6. At this time point, the PC 200 is connected with the digital camera 300 in such a manner that communication can be performed with the digital camera 300.

In step S601, the CPU 201 transmits a start instruction of a remote live view image capturing to the digital camera 300 via the external I/F 206. When the system control unit 311 of the digital camera 300 receives the start instruction of remote live view image capturing, the system control unit 311 shifts to a state in which live view image capturing can be performed, and starts to generate a live view image. In addition, the system control unit 311 transmits various image capturing parameters (an image capturing setting value, a list of values the settings of which can be changed, etc.) required for image capturing control, to the PC 200 via the external I/F 323.

In step S602, the CPU 201 receives image capturing parameters from the digital camera 300. The image capturing parameters received in this step are used for display in each portion of the remote live view screen 400 to be displayed on the display unit 205, and a request for image capturing control that is to be transmitted to the digital camera 300, for example.

In step S603, the CPU 201 displays the remote live view screen 400 on the display unit 205. At this time, the CPU 201 displays various types of data in the functional operation portion 403, for example, based on the various image capturing parameters received in step S602.

In step S604, the CPU 201 requests, via the external I/F 206, the digital camera 300 to transmit a live view image, and receives a live view image as a response.

In step S605, the CPU 201 displays the live view image received in step S604, in the live view display region 401 of the remote live view screen 400 as illustrated in FIG. 4A.

In step S606, the CPU 201 determines whether to display a guide line with being superimposed on the live view image displayed in the live view display region 401. When a setting is made to display a guide line, by a user operation of the display switching operation portion 405, the CPU 201 determines to display a guide line. When the CPU 201 determines to display a guide line (YES in step S606), the CPU 201 advances the processing to step S607. On the other hand, when the CPU 201 determines not to display a guide line (NO in step S606), the CPU 201 advances the processing to step S613.

In step S607, the CPU 201 determines guide line display parameters for displaying the guide lines 408a to 408d with being superimposed on the live view image, and causes the nonvolatile memory 203 to hold (hereinafter, will be described as "set") values. The CPU 201 sets, for each of the guide lines 408a to 408d, coordinates (hereinafter, will be referred to as reference coordinates) that are a display reference point, a rotational angle, a color, and a thickness, for example, as display parameters based on a user operation or setting values. The CPU 201 sets, as reference coordinates of the guide lines 408a to 408d, coordinates of central points of the guide lines 408a to 408d that are set at the time point and determined in accordance with a user operation. In addition, the CPU 201 also sets, as a rotational angle, a value that is based on the horizontal line and is determined in accordance with a user operation. In addition, the CPU 201 sets, as the color and the thickness of the guide lines 408a to 408d, respective values set in accordance with a user operation of the color change operation portion 406 and thickness change operation portion 407. In addition, a parameter as to whether to display a corresponding guide line at the front is included as a display parameter. In this step, the CPU 201 sets, for all the guide lines 408a to 408d, "NO" as parameters as to whether to display corresponding guide lines at the front (to be adjusted as necessary in step S611 to be described below).

In step S608, the CPU 201 determines whether any of the guide lines 408a to 408d is being operated by the user, and branches the processing. When the CPU 201 determines that any of the guide lines 408a to 408d is being operated by the user (YES in step S608), the CPU 201 advances the processing to step S610. On the other hand, when the CPU 201 determines that none of the guide lines 408a to 408d is being operated by the user (NO in step S608), the CPU 201 advances the processing to step S609.

In step S609, the CPU 201 displays the guide lines 408a to 408d with being superimposed on the live view image, based on the display parameters set in step S607. Then, the CPU 201 advances the processing to step S613.

On the other hand, in step S610, the CPU 201 sets numerical label display parameters for displaying the numerical labels 409a to 409d. The CPU 201 sets, for each of the numerical labels 409a to 409d, coordinates (hereinafter, reference coordinates) that are a display reference point, a numerical value to be displayed, a display size, a font size, color, and a parameter as to whether to display a corresponding numerical label at the front, for example, as display parameters. For example, a reference line is displayed as a part of a numerical label, and the center of the reference line is used as a reference coordinate of the numerical label. The CPU 201 sets the reference coordinates in such a manner that the centers of the reference lines 410a to 410d correspond to the central coordinates of the corresponding guide lines 408a to 408d.

In addition, the CPU 201 sets the rotational angles of the guide lines 408a to 408d corresponding to the numerical labels 409a to 409d, as numerical values to be displayed in the numerical labels 409a to 409d. In addition, the CPU 201 sets predefined values prestored in the nonvolatile memory 203, as values of the display size, the font size, and the color of the numerical labels 409a to 409d. In addition, the display size, the font size, and the color of the numerical labels 409a to 409d may be set by the CPU 201 in accordance with the settings made by the user. In this step, the CPU 201 sets, for all the numerical labels 409a to 409d, "NO" as parameters as to whether to display corresponding numerical labels at the front (to be adjusted as necessary in step S611 to be described below).

If display is performed at this time point, the display is performed like the example illustrated in FIG. 4B.

In step S611, the CPU 201 adjusts the display parameters of the guide lines and the display parameters of the numerical labels that have been set in steps S607 and S610. The operation target guide line 408c and the numerical label 409c thereof are thereby displayed to be distinguishable from the operation non-target guide lines 408a, 408b, and 408d, and the numerical labels 409a, 409b, and 409d thereof. The detailed flow of step S611 will be described below with reference to FIG. 7.

In step S612, the CPU 201 displays the guide lines 408a to 408d and the numerical labels 409a to 409d with being superimposed on the live view image based on the display parameters adjusted in step S611. Then, the CPU 201 advances the processing to step S613.

In step S613, the CPU 201 determines whether an end operation of the remote live view has been performed by the user. In the present exemplary embodiment, when an end instruction of the remote image capturing application has been issued by a user operation using a method provided by an operating system (OS) of the PC 200, for example, the CPU 201 determines that an end operation of the remote live view has been performed. When the CPU 201 determines that an end operation has been performed (YES in step S613), the CPU 201 advances the processing to step S614. When the CPU 201 determines that an end operation has not been performed (NO in step S613), the CPU 201 returns the processing to step S604.

In step S614, the CPU 201 transmits an end instruction of the remote live view to the digital camera 300 via the external I/F 206. When the system control unit 311 of the digital camera 300 receives the end instruction of remote live view image capturing, the system control unit 311 ends the generation of a live view image.

In step S615, the CPU 201 causes the display unit 205 to end the display of the remote live view screen 400.

The above-described processing is processing in which the PC 200 displays the remote live view screen 400 on the display unit 205 in a state in which the PC 200 and the digital camera 300 are connected.

Next, the details of the adjustment processing of display parameters in step S611 will be described with reference to FIG. 7.

The description will now be given of an example in which the operation target guide line 408c and the numerical label 409c thereof are displayed at the front, and the display size and the font size of the numerical label 409c are enlarged as illustrated in FIG. 5A.

In step S701, the CPU 201 changes, among the values of the display parameters of the numerical label 409c of the operation target guide line 408c, the value of the parameter of a display size to a value larger than the value set in step S610, and sets the value (that is, overwrites the value).

In step S702, the CPU 201 changes, among the values of the display parameters of the numerical label 409c of the operation target guide line 408c, the value of the parameter of a font size to a value larger than the value set in step S610, and sets the value.

In step S703, the CPU 201 changes, among the values of the display parameters of the operation target guide line 408c, a value as to whether to display the operation target guide line 408c at the front, to "YES". That is to say, the CPU 201 changes the value of the display parameter to display the operation target guide line 408c at the front, and sets the value. In a similar manner, the CPU 201 changes, among the values of the display parameters of the numerical label 409c of the operation target guide line 408c, a value as to whether to display the numerical label 409c at the front, to "YES". That is to say, the CPU 201 changes the value of the display parameter to display the numerical label 409c at the front, and sets the value.

The above-described processing is adjustment processing of display parameters in step S611.

By adjusting display parameters in this manner, in step S612, the CPU 201 displays the operation target guide line 408c and the numerical label 409c thereof anteriorly to the operation non-target guide lines 408a, 408b, and 408d, and the numerical labels 409a, 409b, and 409d thereof. This can enhance the visibility. In addition, the display size and the font size of the numerical label 409c of the operation target guide line 408c are made larger than those of the numerical labels 409a, 409b, and 409d of the operation non-target guide lines 408a, 408b, and 408d, and the numerical label 409c is displayed in the enlarged display size and font size. This can enhance the visibility.

FIG. 9A illustrates an example of guide line display parameters. An adjustment example of guide line display parameters in step S611 will be described with reference to FIG. 9A. FIG. 9A illustrates values of items of display parameters corresponding to the guide lines 408a to 408d in the respective rows. The items of guide line display parameters include reference coordinates (values of x and y), a rotational angle (°), a color, and a parameter as to whether to display a corresponding guide line at the front. In addition, in each item, a value changed in step S611 is indicated in the form of "a value before change"->"a value after change".

In FIG. 9A, among the values of display parameters of the operation target guide line 408c, a value as to whether to display the operation target guide line 408c at the front is changed from "NO" to "YES". This is because the CPU 201 has changed the value in step S703.

In addition, FIG. 9B illustrates an example of numerical label display parameters. An adjustment example of a numerical label display parameter in step S611 will be described with reference to FIG. 9B. FIG. 9B illustrates values of items of display parameters corresponding to the numerical labels 409a to 409d in the respective rows. The items of numerical label display parameters include reference coordinates (values of x and y), a numerical value, a display size (horizontal length×vertical length), a font size of a numerical value, a color, and a parameter as to whether to display a corresponding numerical label at the front. In addition, in each item, a value changed in step S611 is indicated in the form of "a value before change"->"a value after change".

In FIG. 9B, among the values of the display parameters of the numerical label 409c of the operation target guide line 408c, a value of a display size, a value of a font size, and a value as to whether to display the numerical label 409c at the front are changed. This is because the CPU 201 has changed the values in steps S701, S702, and S703.

As described above, the operation target guide line 408c and the numerical label 409c thereof are displayed anteriorly to the operation non-target guide lines 408a, 408b, and 408d, and the numerical labels 409*a*, 409*b*, and 409*d* thereof. The numerical label 409*c* of the operation target guide line 408*c* can be thereby displayed in a visible manner even when the numerical label 409*c* of the operation target guide line 408*c* overlaps a numerical label of an operation non-target guide line (the numerical label 409*b* in the example illustrated in FIG. 5A). Thus, the operation target guide line 408*c* and the numerical label 409*c* thereof can be easily recognized.

In addition, the display size of the numerical label 409*c* of the operation target guide line 408*c* is enlarged, and the font size of a character (numerical value) indicating a rotational angle is enlarged. This can further enhance the visibility of the numerical label 409*c* of the operation target guide line 408*c*. Thus, the operation target guide line 408*c* and the numerical label 409*c* thereof can be easily recognized.

In the present exemplary embodiment, by enlarging the display size and the font size of the numerical label 409*c* of the operation target guide line 408*c*, the visibility of the numerical label 409*c* of the operation target guide line 408*c* is enhanced, but an enhancement method is not limited to this. For example, by reducing a display size and a font size of a numerical label of an operation non-target guide line, a numerical label of an operation target guide line may be relatively emphasized.

In addition, by changing the color of an operation target guide line and a numerical label thereof, and differentiating the color of the operation target guide line and the numerical label thereof from the color of an operation non-target guide line and a numerical label thereof, the operation target guide line and the numerical label thereof may be emphasized. In contrast, the color of an operation non-target guide line and a numerical label thereof may be changed. For example, by increasing the permeability of the color of an operation non-target guide line and a numerical label thereof, an operation target guide line and a numerical label thereof may be relatively emphasized.

In addition, while a numerical label of an operation target guideline is displayed, a numerical label of an operation non-target guide line may be hidden.

Next, a second exemplary embodiment will be described. In addition, the configurations of the PC 200 and the digital camera 300, and basic processing in which the PC 200 displays the remote live view screen 400 on the display unit 205 are similar to those in the first exemplary embodiment. Hereinafter, the description about points common to the first and second exemplary embodiments will be omitted, and different points from the first exemplary embodiment will be mainly described.

Figure 5B:
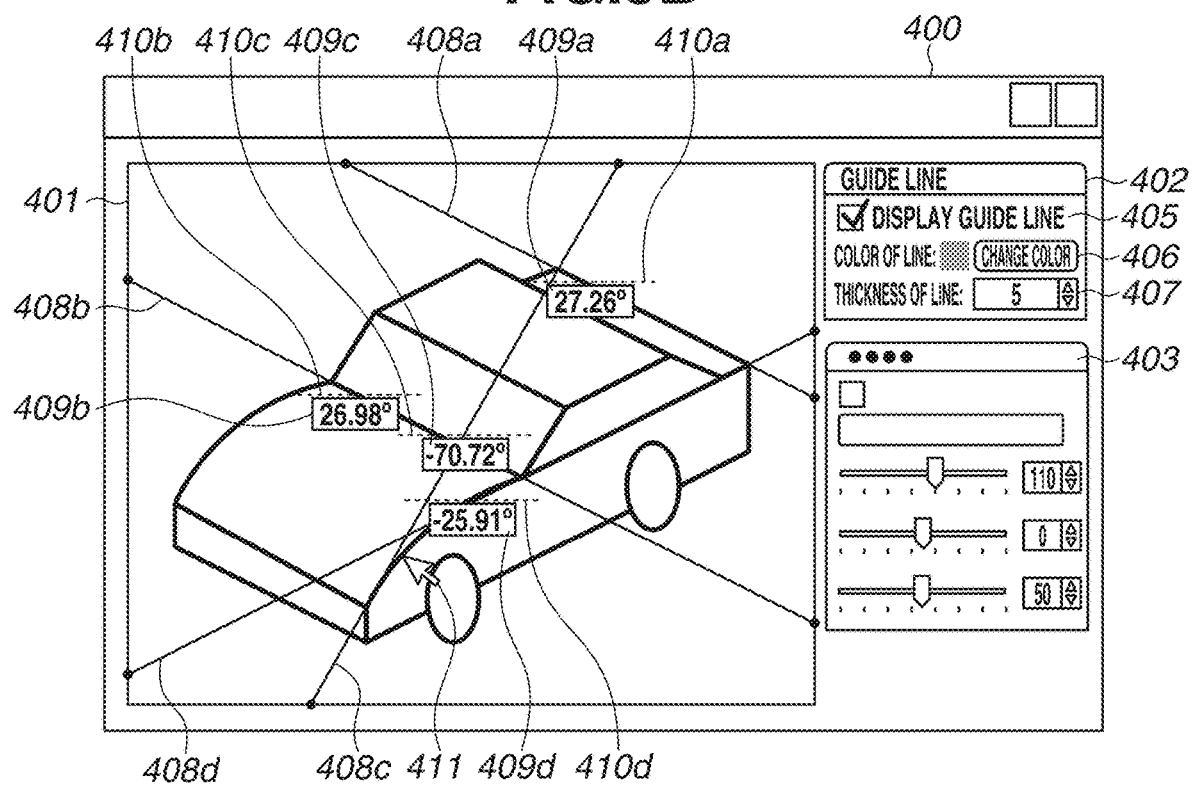

The present exemplary embodiment will be described with reference to FIG. 5B. FIG. 5B illustrates a display example that is an exemplary embodiment of when any of the guide lines 408*a* to 408*d* is being operated by the user on the remote live view screen 400 displayed on the display unit 205 by the PC 200. The description about points common to FIGS. 4B and 5B will be omitted, and different points will be mainly described.

In the present exemplary embodiment, as described below, a numerical label of an operation target guide line and numerical labels of operation non-target guide lines are displayed so as not to overlap each other.

Similarly to FIGS. 4B and 5A, FIG. 5B illustrates, as an example, a state in which the guide line 408*c* is being operated by the user.

In the present exemplary embodiment, the CPU 201 moves the numerical label overlapping at the display position of the numerical label 409*c* among the numerical labels 409*a*, 409*b*, and 409*d* of the operation non-target guide lines 408*a*, 408*b*, and 408*d* so as not to overlap the numerical label 409*c* of the operation target guide line 408*c*. The CPU 201 moves the numerical label 409*b* toward the left side of the original display position illustrated in FIG. 4B, near the corresponding guide line 408*b* in such a manner that the numerical label 409*b* does not overlap the numerical label 409*c*. The numerical label 409*c* of the operation target guide line 408*c* can be thereby displayed in a visible manner. In addition, the numerical label 409*b* of the operation non-target guide line 408*b* can also be displayed in a visible manner.

In addition, display can be continued without moving the numerical label 409*c* of the operation target guide line 408*c* and without changing the relative position with respect to the guide line 408*c*. The user can thereby continue to check the numerical label 409*c* of the operation target guide line 408*c* with a little movement of a viewpoint, and the user can easily follow the operation target guide line 408*c* and the numerical label 409*c* thereof visually.

Figure 8:
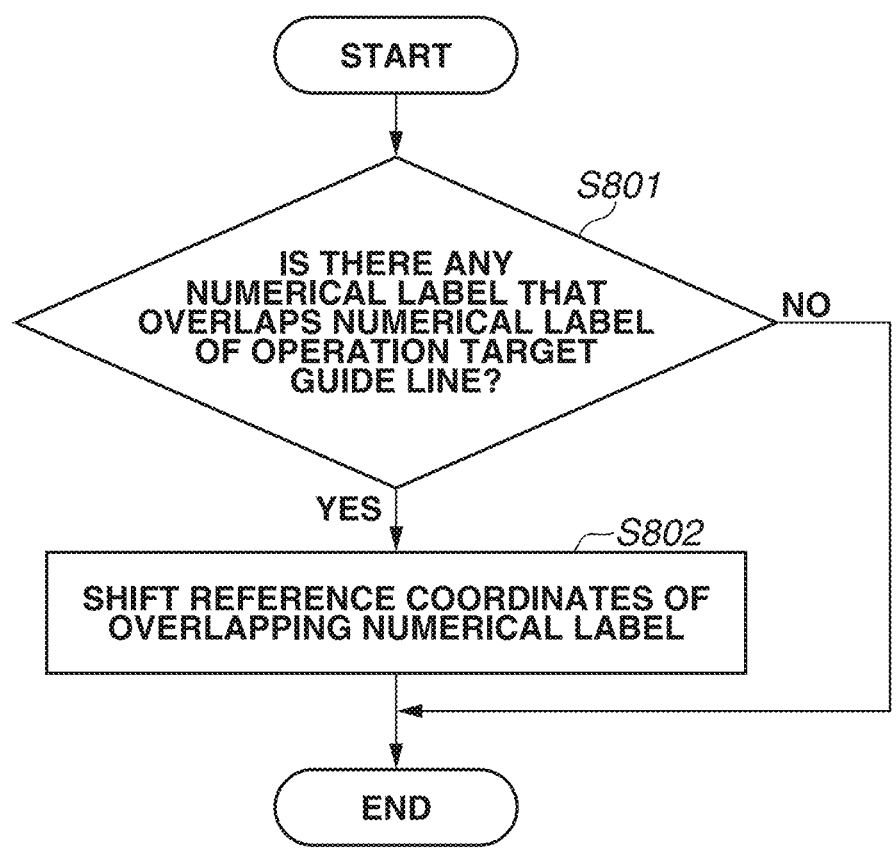
FIG. 8 is a flowchart illustrating an example of adjustment processing of a display parameter according to one embodiment.

Next, the details of adjustment processing of a display parameter in step S611 will be described with reference to FIG. 8.

In step S801, the CPU 201 determines whether any of the numerical labels 409*a*, 409*b*, and 409*d* of the operation non-target guide lines 408*a*, 408*b*, and 408*d* overlaps the numerical label 409*c* of the operation target guide line 408*c*, and branches the processing. At this time, the CPU 201 calculates display regions of the respective numerical labels 409*a* to 409*d* based on reference coordinates and display sizes of the respective numerical labels 409*a* to 409*d*. Then, the CPU 201 determines whether a numerical label overlap another numerical label by determining whether there is an overlapping portion between the display region of the numerical label 409*c* and the display regions of the numerical labels 409*a*, 409*b*, and 409*d*. When the CPU 201 determines that there is a numerical label that overlaps the numerical label 409*c* (YES in step S801), the CPU 201 advances the processing to step S802. On the other hand, when the CPU 201 determines that there is no numerical label that overlaps the numerical label 409*c* (NO in step S801), the CPU 201 ends the processing of the flowchart illustrated in FIG. 8.

In step S802, the CPU 201 adjusts the parameter of the reference coordinates that have been set in step S610, for the numerical label determined in step S801 to overlap the numerical label 409*c*, and sets the adjusted parameter (overwrites the value). The CPU 201 determines the parameter of the numerical label (the numerical label 409*b* in the example illustrated in FIG. 4B) determined to overlap the numerical label 409*c*, while shifting a display coordinate in such a manner that the numerical label 409*b* is away from the numerical label 409*c* by a fixed distance or more, and the reference line is positioned above the corresponding guide line, and sets the parameter.

The above-described processing is adjustment processing of the display parameter in step S611.

By adjusting the display parameter in this manner, in step S612, the CPU 201 displays the numerical label 409*b* of the operation non-target guide line 408*b* at a position different from the position of the numerical label 409*c* of the operation target guide line 408*c*. All the numerical labels 409*a* to 409*d* can be thereby displayed in a visible manner.

In addition, the CPU 201 does not adjust the display position of the numerical label 409*c* of the operation target guide line 408*c*. With this configuration, the numerical label 409*c* of the operation target guide line 408*c* considered to be preferentially checked by the user does not move. The user can therefore check the numerical label 409c with a little movement of a viewpoint.

FIG. 9C illustrates an example of numerical label display parameters. An adjustment example of a numerical label display parameter in step S611 will be described with reference to FIG. 9C. Similarly to FIG. 9B, FIG. 9C illustrates values of items of display parameters corresponding to the numerical labels 409a to 409d in the respective rows. In addition, in each item, a value changed in step S611 is indicated in the form of "a value before change"->"a value after change".

In FIG. 9C, among the values of the display parameters of the numerical label 409b, a value of the reference coordinates is changed. This is because the CPU 201 has determined in step S801 that the numerical label 409b overlaps the numerical label 409c of the operation target guide line 408c, and in step S802, the CPU 201 has changed the reference coordinates of the numerical label 409b.

As described above, the numerical label of the operation non-target guideline is moved and displayed without moving the numerical label 409c of the operation target guide line 408c. This can prevent the numerical label 409c of the operation target guide line 408c from becoming invisible by the numerical label 409b of the operation non-target guide line 408b overlapping the numerical label 409c. Thus, the operation target guide line 408c and the numerical label 409c thereof can be easily recognized. Furthermore, the numerical labels 409a, 409b, and 409d of the operation non-target guide lines 408a, 408b, and 408d can also be displayed in a visible manner. In addition, display can be performed without changing the display position of the numerical label 409c of the operation target guide line 408c, and the user can check the numerical value with a little movement of a viewpoint.

In the present exemplary embodiment, display is performed without changing the display position of the numerical label 409c of the operation target guide line 408c, but the configuration is not limited to this. For example, when a movement amount becomes smaller by moving a numerical label of an operation target guide line rather than moving a numerical label of an operation non-target guide line, the numerical label of the operation target guide line may be moved.

Heretofore, exemplary embodiments of the present disclosure have been described. However, the above-described exemplary embodiments merely indicate specific examples in implementing embodiments of the present disclosure, and the technical scope of the present disclosure is not to be interpreted in a restrictive manner based on these exemplary embodiments. In other words, embodiments of the present disclosure can be implemented in various forms, with or without all the features described above, without departing from the technical ideas, concepts or major features of the present disclosure.

In the present exemplary embodiment, a numerical label is displayed only while a guide line is being operated by the user. With this configuration, while the user is adjusting the position and the rotational angle of the guide line, the user can refer to the numerical label, and after the adjustment of the position and the rotational angle of the guide line ends, the numerical label is hidden so as not to disturb image confirmation. Nevertheless, the configuration is not limited to this. For example, when a guide line is displayed, a numerical label may be always displayed even when a user operation is not performed, in addition to a period during which a user operation is being performed.

In addition, in the present exemplary embodiment, the description has been given of an example in which a PC displays a guide line with being superimposed on a live view image received from an imaging apparatus, but the configuration of the display control apparatus is not limited to this. For example, an imaging apparatus that displays an image on a display unit may function as a display control apparatus. In addition, an image on which a line is superimposed is not limited to a live view image.

According to an exemplary embodiment of the present disclosure, in the case of displaying a plurality of lines and arrangement information regarding the arrangement of each line, with being superimposed on an image, an operation target guide line and arrangement information thereof can be easily recognized.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-179834, filed Sep. 30, 2019, which is hereby incorporated by reference herein in its entirety.

What is claimed is:

1. A display control apparatus that performs control to display an image on a display unit, the display control apparatus comprising:
   a processor; and
   a memory storing a program that, when executed by the processor, causes the display control apparatus to:
   display a plurality of lines in such a manner that the plurality of lines are superimposed on the image displayed on the display unit;

display, when an arrangement change operation is being performed on any line of the plurality of displayed lines, arrangement information regarding arrangement of each of the lines, the arrangement information displayed in a superimposed manner; and execute at least processing for displaying an operation target line to be distinguishable from an operation non-target line, or processing for displaying arrangement information of the operation target line to be distinguishable from arrangement information of the operation non-target line, wherein the processing for displaying the operation target line to be distinguishable from the operation non-target line comprises processing for displaying the operation target line anteriorly to the operation non-target line, and the processing for displaying the arrangement information of the operation target line to be distinguishable from the arrangement information of the operation non-target line comprises processing for displaying the arrangement information of the operation target line anteriorly to the arrangement information of the operation non-target line.

2. The display control apparatus according to claim 1, wherein the processing for displaying the arrangement information of the operation target line to be distinguishable from the arrangement information of the operation non-target line comprises processing for making a display size of the arrangement information of the operation target line larger than a display size of the arrangement information of the operation non-target line.

3. The display control apparatus according to claim 1, wherein the processing for displaying the arrangement information of the operation target line to be distinguishable from the arrangement information of the operation non-target line comprises processing for making a size of a character included in the arrangement information of the operation target line larger than a size of a character included in the arrangement information of the operation non-target line.

4. The display control apparatus according to claim 1, wherein the processing for displaying the operation target line to be distinguishable from the operation non-target line comprises processing for differentiating a color of the operation target line from a color of the operation non-target line, and the processing for displaying the arrangement information of the operation target line to be distinguishable from the arrangement information of the operation non-target line comprises processing for differentiating a color of the arrangement information of the operation target line from a color of the arrangement information of the operation non-target line.

5. The display control apparatus according to claim 1, wherein the display control apparatus further changes a display position of the arrangement information of the operation non-target line that overlaps the arrangement information of the operation target line, among pieces of arrangement information of operation non-target lines, and displays the arrangement information.

6. The display control apparatus according to claim 1, wherein the processing for displaying the operation target line to be distinguishable from the operation non-target line comprises processing for hiding the arrangement information of the operation non-target line.

7. The display control apparatus according to claim 1, wherein an operation for changing a rotational angle of a line can be performed as the arrangement change operation, and wherein the displayed arrangement information includes a rotational angle.

8. The display control apparatus according to claim 7, wherein the display control apparatus further displays a benchmark of a rotational angle.

9. The display control apparatus according to claim 1, wherein the display control apparatus further receives an image captured by an imaging apparatus, and wherein the received image is displayed on the display unit.

10. A display control method comprising:

displaying an image on a display unit;

displaying a plurality of lines in such a manner that the plurality of lines are superimposed on the image displayed on the display unit;

displaying, when an arrangement change operation is being performed on any line of the plurality of displayed lines, arrangement information regarding arrangement of each of the lines, the arrangement information displayed in a superimposed manner; and executing at least processing for displaying an operation target line to be distinguishable from an operation non-target line, or processing for displaying arrangement information of the operation target line to be distinguishable from arrangement information of the operation non-target line, wherein the processing for displaying the operation target line to be distinguishable from the operation non-target line comprises processing for displaying the operation target line anteriorly to the operation non-target line, and the processing for displaying the arrangement information of the operation target line to be distinguishable from the arrangement information of the operation non-target line comprises processing for displaying the arrangement information of the operation target line anteriorly to the arrangement information of the operation non-target line.

11. A non-transitory computer-readable storage medium storing a program that, when executed by a processor, causes the processor to perform operations comprising:

displaying an image on a display unit;

displaying a plurality of lines in such a manner that the plurality of lines are superimposed on the image displayed on the display unit;

displaying, when an arrangement change operation is being performed on any line of the plurality of displayed lines, arrangement information regarding arrangement of each of the lines, the arrangement information displayed in a superimposed manner; and executing at least processing for displaying an operation target line to be distinguishable from an operation non-target line, or processing for displaying arrangement information of the operation target line to be distinguishable from arrangement information of the operation non-target line, wherein the processing for displaying the operation target line to be distinguishable from the operation non-target line comprises processing for displaying the operation target line anteriorly to the operation non-target line, and the processing for displaying the arrangement information of the operation target line to be distinguishable from the arrangement information of the operation non-target line comprises processing for displaying the arrangement information of the operation target line anteriorly to the arrangement information of the operation non-target line.

12. A display control apparatus that performs control to display an image on a display unit, the display control apparatus comprising:
- a processor; and
- a memory storing a program that, when executed by the processor, causes the display control apparatus to:
- display a plurality of lines in such a manner that the plurality of lines are superimposed on the image displayed on the display unit; and
- display, when an arrangement change operation is being performed on any line of the plurality of displayed lines, arrangement information regarding arrangement of each of the lines, the arrangement information displayed in a superimposed manner,
- wherein arrangement information of an operation target line is displayed to not overlap with arrangement information of an operation non-target line, and
- wherein processing is performed for displaying an operation target line to be distinguishable from an operation non-target line and such processing comprises processing for displaying the operation target line anteriorly to the operation non-target line, or processing is performed for displaying the arrangement information of the operation target line to be distinguishable from the arrangement information of the operation non-target line and such processing comprises processing for displaying the arrangement information of the operation target line anteriorly to the arrangement information of the operation non-target line.

13. The display control apparatus according to claim 12, wherein a display position of the arrangement information of the operation non-target line that overlaps the arrangement information of the operation target line, among pieces of arrangement information of operation non-target lines, is changed and displayed.

14. A display control method comprising:
- displaying an image on a display unit;
- displaying a plurality of lines in such a manner that the plurality of lines are superimposed on the image displayed on the display unit; and
- displaying, when an arrangement change operation is being performed on any line of the plurality of displayed lines, arrangement information regarding arrangement of each of the lines, the arrangement information displayed in a superimposed manner,
- wherein arrangement information of an operation target line is displayed to not overlap with arrangement information of an operation non-target line, and
- wherein processing is performed for displaying an operation target line to be distinguishable from an operation non-target line and such processing comprises processing for displaying the operation target line anteriorly to the operation non-target line, or processing is performed for displaying the arrangement information of the operation target line to be distinguishable from the arrangement information of the operation non-target line and such processing comprises processing for displaying the arrangement information of the operation target line anteriorly to the arrangement information of the operation non-target line.

15. A non-transitory computer-readable storage medium storing a program that, when executed by a processor, causes the processor to perform operations comprising:
- displaying an image on a display unit;
- displaying a plurality of lines in such a manner that the plurality of lines are superimposed on the image displayed on the display unit; and
- displaying, when an arrangement change operation is being performed on any line of the plurality of displayed lines, arrangement information regarding arrangement of each of the lines, the arrangement information displayed in a superimposed manner,
- wherein arrangement information of an operation target line is displayed to not overlap with arrangement information of an operation non-target line, and
- wherein processing is performed for displaying an operation target line to be distinguishable from an operation non-target line and such processing comprises processing for displaying the operation target line anteriorly to the operation non-target line, or processing is performed for displaying the arrangement information of the operation target line to be distinguishable from the arrangement information of the operation non-target line and such processing comprises processing for displaying the arrangement information of the operation target line anteriorly to the arrangement information of the operation non-target line.

* * * * *